(12) United States Patent
Kristensen et al.

(10) Patent No.: US 12,455,208 B2
(45) Date of Patent: Oct. 28, 2025

(54) SYSTEM AND METHOD FOR ACOUSTIC LEAKAGE DETECTION BY USE OF AN ULTRASONIC FLOW METER

(71) Applicant: Kamstrup A/S, Skanderborg (DK)

(72) Inventors: Mick Althoff Kristensen, Skanderborg (DK); Sune Hoveroust Dupont, Skanderborg (DK)

(73) Assignee: KAMSTRUP A/S, Skanderborg (DK)

( * ) Notice: Subject to any disclaimer, the term of this patent is extended or adjusted under 35 U.S.C. 154(b) by 570 days.

(21) Appl. No.: 17/730,521

(22) Filed: Apr. 27, 2022

(65) Prior Publication Data

US 2022/0349773 A1   Nov. 3, 2022

(30) Foreign Application Priority Data

Apr. 30, 2021   (EP) .................................... 21171613

(51) Int. Cl.
| | |
|---|---|
| *G01M 3/28* | (2006.01) |
| *E03B 7/00* | (2006.01) |
| *E03B 7/07* | (2006.01) |
| *F17D 5/06* | (2006.01) |
| *G01F 1/66* | (2022.01) |

(Continued)

(52) U.S. Cl.
CPC .......... *G01M 3/2807* (2013.01); *G01F 1/662* (2013.01); *E03B 7/003* (2013.01); *E03B 7/071* (2013.01); *E03B 7/072* (2013.01); *E03B 7/075* (2013.01); *F17D 5/06* (2013.01); *G01F 1/66* (2013.01); *G01F 1/666* (2013.01); *G01F 1/667* (2013.01); *G01M 3/243* (2013.01); *G08C 17/02* (2013.01)

(58) Field of Classification Search
CPC ..... G01M 3/2807; G01M 3/243; G01F 1/662; G01F 1/666; G01F 1/667; G01F 1/66; G08C 17/02; E03B 7/003; E03B 7/071; E03B 7/072; E03B 7/075; F17D 5/06
See application file for complete search history.

(56) References Cited

U.S. PATENT DOCUMENTS

| 4,327,576 A * | 5/1982 | Dickey ................. G01M 3/243 73/40.5 A |
|---|---|---|
| 6,389,881 B1 | 5/2002 | Yang |

(Continued)

FOREIGN PATENT DOCUMENTS

| CN | 103292160 A | 9/2013 |
|---|---|---|
| EP | 3112820 A1 | 1/2017 |

(Continued)

*Primary Examiner* — Jonathan M Dunlap
(74) *Attorney, Agent, or Firm* — McGlew and Tuttle, P.C.

(57) ABSTRACT

A method for acoustic leakage detection in a fluid pipe network (1) uses at least one ultrasonic flow meter (13) installed at a pipe (15, 17). The pipe connects a consumer site (3) to the fluid pipe network. The method includes detecting at least one sound wave traveling along the pipe and/or along fluid within the pipe from a sound source to the at least one ultrasonic flow meter, determining the traveling direction of at least one of the at least one sound wave, interpreting a sound wave of the at least one sound wave as a leakage sound candidate if the determined traveling direction of said sound wave is towards the consumer site, and interpreting a sound wave of the at least one sound wave as a background noise if the determined traveling direction of said sound wave is away from the consumer site.

18 Claims, 3 Drawing Sheets

(51) Int. Cl.
*G01F 1/667* (2022.01)
*G01M 3/24* (2006.01)
*G08C 17/02* (2006.01)

(56) References Cited

U.S. PATENT DOCUMENTS

| | | | |
|---|---|---|---|
| 6,453,247 B1* | 9/2002 | Hunaidi | G01M 3/243 |
| | | | 702/54 |
| 7,810,378 B2* | 10/2010 | Hunaidi | G01M 3/243 |
| | | | 73/49.1 |
| 7,920,983 B1* | 4/2011 | Peleg | G06Q 10/06 |
| | | | 702/50 |
| 8,346,492 B2* | 1/2013 | Yang | G01M 3/36 |
| | | | 73/594 |
| 10,401,254 B2* | 9/2019 | Giunta | F17D 5/06 |
| 10,527,515 B2* | 1/2020 | Brennan, Jr. | G01M 3/2807 |
| 2005/0209795 A1* | 9/2005 | Ao | G01F 1/667 |
| | | | 702/50 |
| 2008/0314122 A1* | 12/2008 | Hunaidi | G01M 3/243 |
| | | | 73/40.5 A |
| 2009/0007968 A1* | 1/2009 | Knecht | G01M 3/2807 |
| | | | 137/557 |
| 2009/0299660 A1* | 12/2009 | Winter | G01M 3/28 |
| | | | 73/40 |
| 2010/0268489 A1* | 10/2010 | Lie | G01M 3/246 |
| | | | 702/51 |
| 2012/0007743 A1 | 1/2012 | Soloman | |
| 2012/0079872 A1 | 4/2012 | Schaefer et al. | |
| 2012/0111799 A1* | 5/2012 | Lemoine | G01N 33/1886 |
| | | | 210/96.1 |
| 2015/0300907 A1* | 10/2015 | Giunta | G01H 1/00 |
| | | | 702/39 |
| 2017/0307466 A1* | 10/2017 | Brennan, Jr. | G01F 1/666 |
| 2022/0163420 A1* | 5/2022 | Stephens | G01N 33/2045 |

FOREIGN PATENT DOCUMENTS

| | | |
|---|---|---|
| EP | 3112823 A1 | 1/2017 |
| EP | 3236227 A2 | 10/2017 |
| WO | 2020247982 A1 | 12/2020 |

* cited by examiner

SYSTEM AND METHOD FOR ACOUSTIC LEAKAGE DETECTION BY USE OF AN ULTRASONIC FLOW METER

CROSS REFERENCE TO RELATED APPLICATIONS

This application claims the benefit of priority under 35 U.S.C. § 119 of European Application 21 171 613.9, filed Apr. 30, 2021, the entire contents of which are incorporated herein by reference.

TECHNICAL FIELD

The present disclosure refers to a method and system for acoustic leakage detection in a fluid pipe network, in particular a liquid distribution network.

TECHNICAL BACKGROUND

Utility providers of water, heat and/or gas typically use a fluid pipe network to distribute water, heat and/or gas to a plurality of consumer sites. It is very important for a utility provider to detect any leakages in the fluid pipe network as quickly as possible. It is further desirable for a utility provider to locate a leakage as precisely as possible and to get an estimate about the size of the leakage.

It is known, for instance from EP 3 112 823 A1, to perform an acoustic leak detection by use of ultrasonic flow meters installed at a consumer site. The principal idea of such acoustic leak detection is that ultrasonic flow meters primarily installed at consumer sites to measure and report a consumed quantity to an automatic meter reading system can also be used as a microphone to listen into the fluid pipe network for leakage sounds.

It is, however, problematic that there is often a very high level of background noise present, which leads to a relatively small signal-to-noise ratio. Such a small signal-to-noise ratio either leads to a relatively low sensitivity for detecting leakages or to a relatively high rate of false leakage alarms.

SUMMARY

It is therefore one object of the present invention to provide a method and system for acoustic leak detection in a fluid pipe network with increased sensitivity for detecting leakages and/or reduced rate of false alarms.

This object is achieved by a method according to this disclosure, an ultrasonic flow meter, and a system according to according to this disclosure. Preferred embodiments are detailed in the following description and the accompanying drawings.

According to a first aspect of the present disclosure, a method for acoustic leakage detection in a fluid pipe network by use of at least one ultrasonic flow meter installed at a pipe is provided, wherein the pipe connects a consumer site to the fluid pipe network, the method comprising:
  detecting at least one sound wave traveling along the pipe and/or along fluid within the pipe from a sound source to the at least one ultrasonic flow meter,
  determining the traveling direction of at least one of the at least one sound wave,
  interpreting a sound wave of said at least one sound wave as a leakage sound candidate if the determined traveling direction of said sound wave is towards the consumer site, and
  interpreting a sound wave of said at least one sound wave as a background noise if the determined traveling direction of said sound wave is away from the consumer site.

The step of interpreting said one of the at least one sound wave as a leakage sound candidate may include triggering a leakage alarm and/or providing leakage information data that may serve as basis for deciding whether to trigger a leakage alarm or not. The step of interpreting said one of the at least one sound wave as a background noise may comprise suppressing a leakage alarm or non-triggering of a leakage alarm. The present disclosure is based on the inventors' insight that most of the background noise comes from another direction than a leakage sound. Typically, background noise is produced by apparatuses at the consumer site, such as a circulator pump or other vibrating devices. Such a background noise travels along the pipes and/or along fluid within the pipes at the consumer site. As the ultrasonic flow meter is installed at a pipe connecting the consumer site with the fluid pipe network of the utility provider, the ultrasonic flow meter detects such background noise as sound waves coming from the consumer site. In the context of the present disclosure, the utility provider is less interested in a leakage within the realm of the consumer site and rather interested in any leakage in the fluid pipe network outside of the consumer site. Detecting leakages within the realm of the consumer site may be subject to other technical solutions outside the context of the present disclosure. According to the present disclosure, a sound wave is only interpreted as a leakage sound candidate if it does not come from the consumer site where the typical sound sources for background noise are expected to be located.

It depends on the specific application whether the direction towards the consumer site is the nominal fluid flow direction through the ultrasonic flow meter or the opposite. In service water or gas supply systems, the nominal fluid flow direction is towards the consumer household. In a district heating network, the ultrasonic flow meter may be installed at a feed line or a return line, wherein the direction towards the consumer site is the nominal fluid flow direction through the ultrasonic flow meter at a feed line and the opposite at a return line, wherein a service technician may use a user interface for inputting information about the installation at the feed line or the return line. The nominal fluid flow direction through the ultrasonic flow meter may be marked by a graphical indication on the ultrasonic flow meter.

So, in most applications, the sound wave is only interpreted as a leakage sound candidate if the determined traveling direction of said sound wave is the nominal fluid flow direction towards the consumer site. In the exceptional case that the ultrasonic flow meter is installed at the return line of a district heating network, the interpretation logic is simply reversed. In any case, the leakage sound is expected to travel towards the consumer site, whereas the background noise is expected to come from the consumer site.

Optionally, determining the traveling direction of said sound wave may be based on a phase shift, on a time shift and/or on an amplitude difference between a first signal generated by a first ultrasonic transducer of the at least one ultrasonic flow meter and a second signal generated by a second ultrasonic transducer of the at least one ultrasonic flow meter, wherein the first ultrasonic transducer and the second ultrasonic transducer have an axial distance to each other. Alternatively, or in addition, the ultrasonic flow meter may comprise a microphone and/or an accelerometer for detecting the at least one sound wave. However, it is most preferred to use the two ultrasonic transducers present in most ultrasonic flow meters for determining the traveling direction. Usually, the two ultrasonic transducers transmit and receive ultrasonic signals for measuring the fluid flow. When there is a no-fluid-flow situation, however, the ultrasonic transducers can be used as "microphones" to listen for a leakage sound. Depending on the traveling direction of the sound wave, one of the ultrasonic transducers is located closer to the sound source than the other ultrasonic transducer. Therefore, the signals generated by the ultrasonic transducers differ from each due to their axial distance to each other. For instance, the second signal may be phase shifted compared to the first signal. Such a phase shift is particularly applicable for determining the traveling direction of a continuous sound wave, which can be approximated by a sinusoidal sound wave in first order. Alternatively, in particular in case of sound wave pulses, there may be a time shift between the first signal and the second signal, wherein the sign of the time shift is indicative of the traveling direction of the sound wave. The first signal and the second signal may also differ by their amplitude, because it is expected that the amplitude reduces on the way between the ultrasonic transducers. So, the sign of the amplitude difference may also be indicative of the traveling direction of the sound wave.

Optionally, the method may further comprise identifying the at least one sound wave as a superposition of a first sound wave traveling towards the consumer site and a second sound wave traveling away from the consumer site, the method further comprising interpreting the first sound wave as a leakage sound candidate and the second sound wave as a background noise. This is particularly useful in case of a relatively loud background noise with a frequency that differs significantly from a frequency of a relatively low leakage sound. The sensitivity for such low leakage sounds in presence of a relatively loud background noise can therefore be significantly increased by subtracting the background noise identified by its traveling direction.

Optionally, identifying a dominant frequency band in said sound wave if said sound wave is interpreted as a background noise, and subtracting the dominant frequency band from the at least one sound wave. The dominant frequency band can be a sinusoidal first order approximation to the background noise that can be subtracted from the detected sound wave. In case there is a residual sound wave after subtracting the dominant frequency band, a traveling direction of the residual sound wave towards the consumer site indicates that the residual sound wave is to be interpreted as a leakage sound candidate.

Optionally, the method may further comprise setting or updating a leakage information data comprising information about an amplitude of said sound wave and the traveling direction of said sound wave. Said leakage information data allows to perform the interpretation of the sound wave outside of the ultrasonic flow meter. Alternatively, or in addition, the ultrasonic flow meter may use the leakage information data itself to trigger a leakage alarm.

Optionally, the method may further comprise measuring a fluid flow through the pipe, wherein setting or updating the leakage information data is regularly, continuously or sporadically performed based on a predetermined schedule, or upon an external command, and only when a measured fluid flow is below a flow threshold or zero. So, the ultrasonic flow meter is used for its primary purpose, i.e. measuring a fluid flow through the pipe, in a fluid flow situation and used to set or update the leakage information data in a no-fluid-flow situation when the measured fluid flow is below a flow threshold or zero.

Optionally, the method may further comprise wirelessly transmitting, regularly or sporadically based on a predetermined schedule, or upon an external command, the leakage information data from the at least one ultrasonic flow meter to an automatic meter reading system. For instance, a predetermined data sequence in the communication protocol between the ultrasonic flow meter and the automatic meter reading system may be reserved for the leakage information data. For example, the leakage information data may comprise an integer value on an arbitrary scale, e.g. 0 to 1023, represented by ten bits, and a Boolean value for the traveling direction, represented by one more bit.

Optionally, the leakage information data may be transmitted in the course of scheduled readings or fluid flow and/or consumption data. Thereby, no extra energy is spent on transferring the leakage information data from the ultrasonic flow meter to the automatic meter reading system.

Optionally, the method may further comprise validating the leakage information data by comparison with leakage information data received within a predetermined time window by the automatic meter reading system from one or more other ultrasonic flow meters installed in the fluid pipe network. This is beneficial to further reduce the rate of false leakage alarms, because it is unlikely that a leakage is not heard as well by other ultrasonic flow meters at other consumer sites in the vicinity.

Optionally, the method may further comprise wirelessly transmitting a leakage detection command signal from an automatic meter reading system to the at least one ultrasonic flow meter, wherein setting or updating the leakage information data is performed upon reception of the leakage detection command signal. This is particularly useful if the utility provider has a distinct suspicion of a leakage and requests the leakage information data from one or more ultrasonic flow meters in the vicinity of the suspected leakage by sending the leakage detection command signal to those ultrasonic flow meters.

Optionally, the method may further comprise receiving by the automatic meter reading system leakage information data from one of the at least one ultrasonic flow meter, wherein the leakage detection command signal is transmitted to one or more ultrasonic flow meters in the vicinity of said ultrasonic flow meter for validating said information data. So, it further increases the sensitivity of the leakage detection and further reduces the rate of false leakage alarms if more than one ultrasonic flow meter is used to listen into the fluid pipe network for a suspected leakage in a certain area.

In a specific embodiment of the method according the present disclosure, at least two ultrasonic flow meters may be installed at a consumer site. One of the flow meters may be installed at a service water pipe connecting the consumer site to a service water supply pipe network line. The other one of the flow meters may be installed at a pipe connecting the consumer site to a district heating network. Although the flow meters are installed at pipes connecting the consumer site to different fluid pipe networks, sound waves in one fluid pipe network may also travel in the other fluid pipe network, e.g. via walls, concrete, brackets or other material. If both flow meters detect a sound wave in a time-wise coincidence and both have determined that the traveling direction of the sound wave is towards the consumer site, it is very likely that the sound source is a leakage. The flow meters can perform the determination of direction in a coordinated manner or not, i.e. synchronized or unsynchronized. Both flow meters may report the respective leakage information data to the head-end system (HES) or, in a bidirectional communication setup, to each other.

According to another aspect of the present disclosure, an ultrasonic flow meter for measuring a fluid flow in a pipe connecting a consumer site to a fluid pipe network is provided, wherein the ultrasonic flow meter comprises:

at least one ultrasonic transducer configured for measuring ultrasonic signals for determining a fluid flow, and
a processing means in signal connection with the at least one ultrasonic transducer, characterized in that the at least one ultrasonic transducer is further configured to detect at least one sound wave traveling along the pipe and/or along fluid within the pipe from a sound source to the at least one ultrasonic flow meter in a no-fluid-flow situation, in that the processing means is configured to determine the traveling direction of at least one of the at least one sound wave, and in that the processing means is configured to use or provide information about the determined traveling direction for interpreting said sound wave as a leakage sound candidate if the determined traveling direction is towards the consumer site and as a background noise if the determined traveling direction is away from the consumer site. Preferably, the ultrasonic flow meter is battery-powered and comprises a signal transmitter for wirelessly transmitting consumption data.

So, the ultrasonic flow meter may use the information about the determined traveling direction for providing leakage information data itself for interpretation. In such an embodiment, the interpretation of the sound wave as a leakage sound candidate or as a background noise is performed by the processing means of the ultrasonic flow meter. Preferably, however, in order to save as much energy of the preferably battery-powered ultrasonic flow meter, the interpretation of the sound wave as a leakage sound candidate or as a background noise is performed outside of the ultrasonic flow meter, e.g. a head-end-system (HES) of an automatic meter reading system. In such an embodiment, the ultrasonic flow meter simply provides the leakage information data for the interpretation of the sound wave outside of the ultrasonic flow meter.

Optionally, the ultrasonic flow meter may comprise at least two ultrasonic transducers comprising a first ultrasonic transducer and a second ultrasonic transducer, wherein the first ultrasonic transducer and the second ultrasonic transducer have an axial distance to each other, wherein the processing means is configured to determine the traveling direction of said sound wave based on a phase shift, on a time shift and/or on an amplitude difference between a first signal generated by the first ultrasonic transducer and a second signal generated by the second ultrasonic transducer. It is particularly beneficial to use the two ultrasonic transducers, primarily used for measuring the flow in a fluid flow situation, for determining the traveling direction of sound waves in a no-fluid-flow situation.

Optionally, the traveling direction towards the consumer site may be the nominal direction of fluid flow through the ultrasonic flow meter. In case of water or gas supply systems, the ultrasonic flow meter is usually installed on a feed line at the consumer site to provide the consumer with water or gas. As the ultrasonic flow meter has a predetermined nominal direction of fluid flow, it does not need additional information about where the consumer site is located from the perspective of the ultrasonic flow meter. In case of a district heating network for providing the consumer site with heat, the ultrasonic flow meter may be installed at a feed line or a return line at the consumer site. Upon installation of the ultrasonic flow meter at a return line, an information flag may be set by the processing means indicating that the traveling direction towards the consumer site is opposite the nominal direction of fluid flow through the ultrasonic flow meter. Alternatively, the information about individual ultrasonic flow meters being installed on a feed line or a return line may be stored in a data base accessible for the interpretation of the sound wave.

According to another aspect of the present disclosure, a system for acoustic leakage detection in a fluid pipe network is provided, wherein the system comprises at least one ultrasonic flow meter as described above and an automatic meter reading system for wirelessly receiving fluid flow and/or consumption data from the at least one ultrasonic flow meter, wherein the at least one ultrasonic flow meter is further configured to wirelessly transmit, regularly or sporadically based on a predetermined schedule, or upon an external command, leakage information data comprising information about an amplitude of said sound wave and the traveling direction of said sound wave.

Preferably, a head-end-system (HES) of the automatic meter reading system may receive the leakage information data and interprets the sound wave as a leakage sound candidate or a background noise for triggering a leakage alarm or not.

Optionally, the at least one ultrasonic flow meter of the system may be configured to transmit the leakage information data in the course of scheduled readings of a fluid flow and/or consumption data. As pointed out above, this is useful to save as much energy of the preferably battery-powered ultrasonic flow meter, because no extra energy is spent on wirelessly transmitting the leakage information data.

Optionally, the automatic meter reading system may be configured to validate the leakage information data received from the at least one ultrasonic flow meter by leakage information data received within in a predetermined time window from one or more other ultrasonic flow meters installed in the fluid pipe network. Preferably, these other ultrasonic flow meters are located in the vicinity of the ultrasonic flow meter sending the leakage information data to be validated. So, in case there is a time-wise and location-wise coincidence of sound waves interpreted as leakage sound candidates, the risk of a false leakage alarm is low.

Optionally, the automatic meter reading system may be configured to wirelessly transmit a leakage detection command signal to the at least one ultrasonic flow meter, wherein the ultrasonic flow meter is configured to set or update the leakage information data upon reception of the leakage detection command signal.

Optionally, the system may further comprise a plurality of ultrasonic flow meters installed different pipes connecting different consumer sites to the same fluid pipe network, wherein an automatic meter reading system is configured to receive leakage information data from one or more of said plurality of ultrasonic flow meters. Preferably, the plurality of ultrasonic flow meters form a group of ultrasonic flow meters installed in a certain area of the fluid pipe network.

Optionally, the automatic meter reading system may be configured to transmit the leakage detection command signal to another one or more of said plurality of ultrasonic flow meters in the vicinity of said ultrasonic flow meter for validating said leakage information data.

The method disclosed herein may be implemented in form of compiled or uncompiled software code that is stored on a computer readable medium with instructions for executing the method. Alternatively, or in addition, the method may be executed by software in a cloud-based system and/or a head-end-system (HES) of an automatic meter reading system in combination with a programmed processor within the at least one ultrasonic flow meter.

Embodiments of the present disclosure will now be described by way of example with reference to the following figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
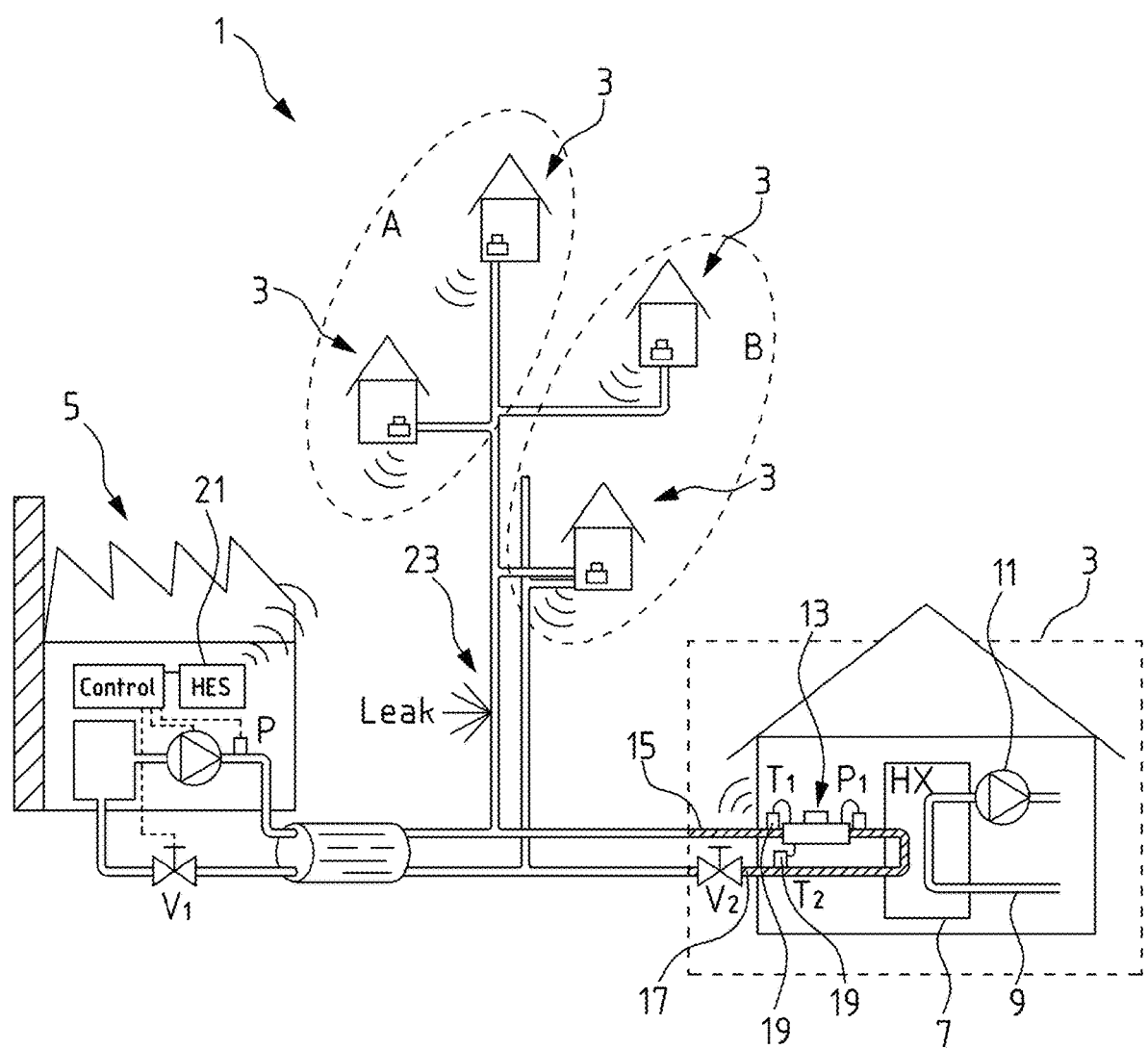
FIG. 1 is a schematic view of a fluid pipe network with a system for acoustic leakage detection according to the present disclosure.

Referring to the drawings, FIG. 1 shows a fluid pipe network 1 in form of a district heating network for supplying consumer sites 3 with heat from a district heating plant 5. The consumer sites 3 may be private households, industrial consumers, or any other type of consumer site that represents a billable entity for a utility provider managing the district heating plant 5. It should be noted that the fluid pipe network 1 as shown in FIG. 1 in form of a district heating network is just an example. The fluid pipe network 1 could alternatively be a service water distribution network for supplying the consumer sites 3 with water or a gas supply network for supplying the consumer sites 3 with gas.

In the district heating network 1 as shown in FIG. 1, the heat is typically transferred from the fluid pipe network 1 to the consumer site 3 by way of a heat exchanger 7 as part of a heating system 9 at the consumer site 3. The heating system 9 at the consumer site 3 usually comprises a circulation pump 11 for transporting heated fluid to radiators or underfloor heating.

At each consumer site 3, there is an ultrasonic flow meter 13 installed at a pipe 15, 17 connecting the consumer site 3 to the fluid pipe network 1. In the example shown in FIG. 1, the ultrasonic flow meter 13 is installed at a pipe 15 connecting to a feed line of the district heating network 1. Alternatively, the ultrasonic flow meter 13 may be installed at pipe 17 connecting the consumer site 3 to a return line of the district heating network 1.

The ultrasonic flow meters 13 are in this shown example heat meters that are configured to measure, store and report heat consumption data. Two temperature sensors 19 may be provided at the pipes 15, 17 connecting to the feed line and the return line, respectively, for the ultrasonic flow meter 13 to register a temperature differential. In combination with a measured fluid flow in any fluid flow situation the ultrasonic flow meter can provide heat consumption data.

The ultrasonic flow meters 13 comprise one or more ultrasonic transducer configured to measure ultrasound signals and a processing means (processor) in signal connection with the one or more ultrasonic transducer. The processor is configured to determine a traveling direction of at least one of the at least one sound wave traveling along the pipe and/or along fluid within the pipe from a sound source to the ultrasonic flow meter in a no-fluid-flow situation and to use or provide information about the determined traveling direction for interpreting said sound wave as a leakage sound candidate if the determined traveling direction is towards the consumer site and as a background noise if the determined traveling direction is away from the consumer site. The ultrasonic flow meters 13 further comprises a wireless signal transmitter configured to wirelessly transmit, regularly or sporadically based on a predetermined schedule, or upon an external command, the heat consumption data via a wireless communication network (not shown) to a head-end-system (HES) 21 of an automatic meter reading system managed by the utility provider. The head-end-system (HES) 21 is shown in FIG. 1 to be located within the district heating plant 5. However, it should be understood that the head-end-system (HES) 21 may be located anywhere, e.g. in form of a cloud-based system or a computer server anywhere else. The automatic meter reading system may comprise a dedicated wireless communication network or may make use of an existing wireless communication network, e.g. a cellular mobile phone network, for communication between the head-end-system (HES) 21 and the ultrasonic flow meters 13 installed at the different consumer sites 3.

FIG. 1 shows a situation of a leakage 23 in a feed line of the fluid pipe network 1. A utility provider is highly interested in detecting the leakage 23 as quickly as possible, locating the leakage 23 as accurately as possible, and to estimate the size of the leakage 23 as well as possible. For this, the ultrasonic flow meters 13 can be used as "microphones" to listen into the fluid pipe network 1 for acoustic leak detection. This is, because the leakage 23 makes a leakage noise that travels along the pipes of the fluid pipe network 1 and/or along the fluid within the pipes. Acoustic leakage detection is preferably performed in a no-fluid-flow situation, in which there is no fluid-flow in the pipe 15, 17 the ultrasonic flow meter 13 is installed at, or at least the fluid flow is below a flow threshold. Thereby, the acoustic leakage detection is not hampered by fluid flow noise.

However, other background noise usually makes leakage detection difficult. For instance, the circulator pump 11 or other vibrations at the consumer site 3 is often present. The amplitude of such background noise may be factors or even magnitudes higher than the leakage sound of the leakage 23. The idea of the present disclosure is now to determine the traveling direction of a sound wave detected by the ultrasonic flow meter and to use the traveling direction as a filter criterium to increase the signal-to-noise ratio, e.g. the average amplitude of the leakage sound divided by the average amplitude of background noise. The filtering is based on the insight that most of the expected sound sources for background noise are located at the consumer site 3 and thus the sound waves of the background noise usually travel away from the consumer site 3. The leakage noise, however, travels towards the consumer site 3, so that the determined traveling direction can be used to separate the leakage sound from most of the background noises. In other words, any sound wave traveling towards the consumer site 3 is interpreted as a leakage sound candidate and any sound wave traveling away from the consumer site 3 is interpreted as a background noise. The interpretation of the sound wave may be performed directly at the ultrasonic flow meter 13, but preferably at the head-end-system (HES) 21 that receives leakage information data wirelessly from the ultrasonic flow meters 13.

Figure 2:
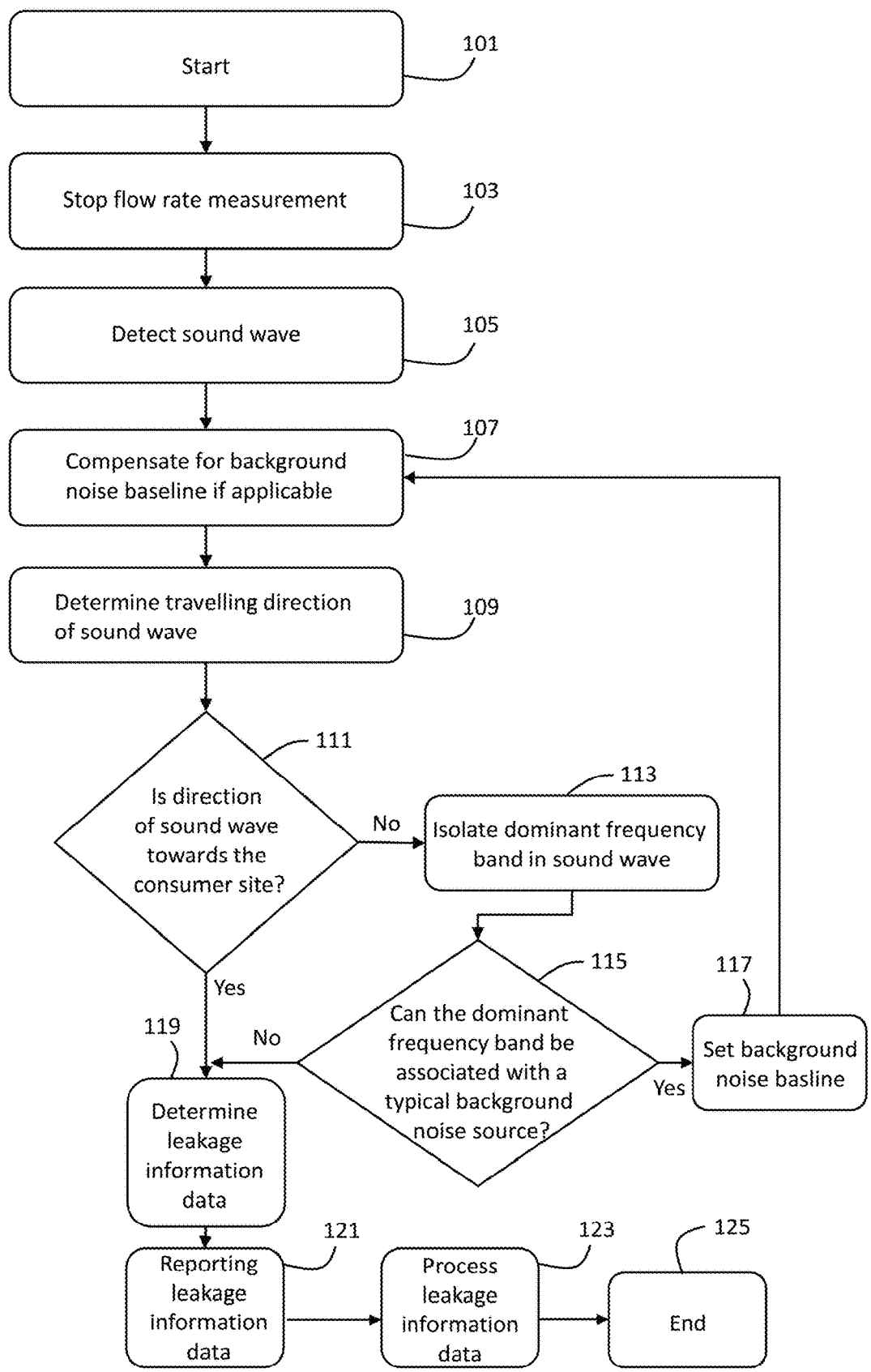
FIG. 2 is a schematic flow diagram of an embodiment of a method for acoustic leak detection according to the present disclosure.

FIG. 2 shows a flow diagram of steps of an example of a method for acoustic leak detection according to the present disclosure. Acoustic leak detection may start at step 101. The start 101 may be triggered regularly or sporadically based on a predetermined schedule or a upon an external command, e.g. a leakage detection command signal received by a ultrasonic flow meter 13 from the head-end-system (HES) 21. The ultrasonic flow meter 13 may detect a no-fluid-flow-situation, in which the fluid flow is below a flow threshold or zero, and stops the flow rate measurement at step 103. At step 105, the ultrasonic flow meter 13 detects a sound wave signal traveling along the pipe 15, 17 and/or along fluid within the pipe 15, 17 from a sound source to the ultrasonic flow meter 13. In case a background noise baseline is already set, it is compensated for by subtracting the background noise baseline from the detected sound wave in step 107. In the following step 109, the traveling direction of the sound wave is determined. This could be the sound wave detected in step 105 or a residual sound wave after subtracting the background noise baseline in step 107. In step 111, the sound wave, of which the direction was determined in step 109, is interpreted differently depending on whether the traveling direction of said sound wave is towards the customer site 3 or away from the customer site 3. If the traveling direction determined in step 109 is away from the consumer site 3, the sound wave is interpreted as a background noise and a dominant frequency band is isolated from the background noise in step 113. The isolated dominant frequency band is compared with a typical known background noise source, e.g. a circulator pump 11 running at a known speed, for associating the dominant frequency band with one of such known typical background noise sources. If the dominant frequency band can be associated with a typical background noise source, the dominant frequency band may be set in step 117 as the background noise baseline to be used in step 107 for subtracting from the sound wave detected in step 105. If the dominant frequency band cannot be associated with a typical background noise source, leakage information data is determined in step 119. The leakage information data comprises information about the amplitude of the background noise and an information that the traveling direction of the background noise is away from the consumer site 3. So, the background noise and/or the dominant frequency band thereof may be analyzed for other purposes, e.g. leakage detection within the consumer site, or learning about new background noise sources and their dominant frequency band.

If the traveling direction of the sound wave determined in step 109 is found in step 111 to be towards the consumer site 3, the leakage information data determined in step 119 contains information about the amplitude of the leakage sound candidate and an information that the traveling direction of the leakage sound candidate is towards the consumer site 3. For example, the amplitude may be represented by an integer value on an arbitrary scale, i.e. 0 to 1.023 represented by 10 Bits. The information about the traveling direction may be a Boolean value represented by a single bit. In step 121, the leakage information data is reported wirelessly to the head-end-system (HES) 21. At the head-end-system (HES) 21, the leakage information data received from the ultrasonic flow meters 13 is processed in step 123. So, the head-end-system (HES) 21 uses the leakage information data for interpretation and deciding on whether triggering a leakage alarm or not. The information about the traveling direction in the leakage information data may be used as a filter criterium for triggering a leakage alarm or not. Further filter criteria may be applied, such as a minimum amplitude threshold and/or a time-wise and location-wise coincidence of matching leakage information data from several ultrasonic flow meters 13. The acoustic leak detection may end at step 125 until it is restarted in step 101.

Figure 3A:
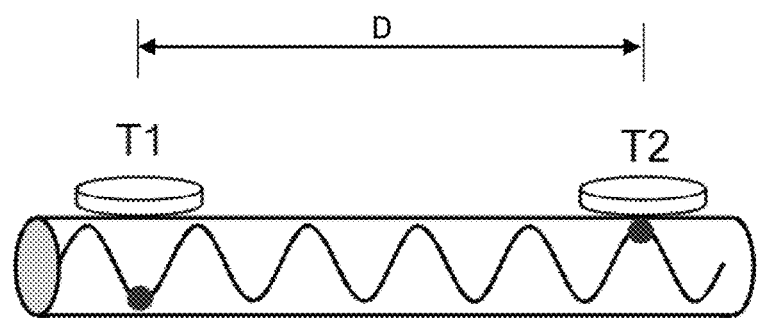
FIGS. 3a, 3b and 3c are schematic views showing three different options for determining the traveling direction of sound waves by an ultrasonic flow meter according to the present disclosure.
Figure 3B:
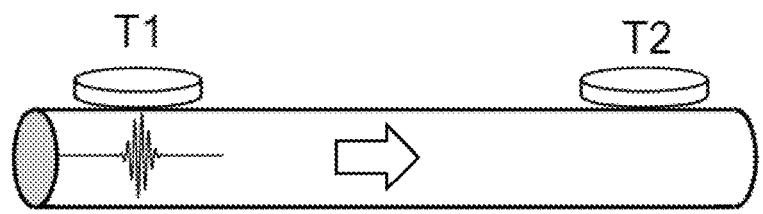
Figure 3B:
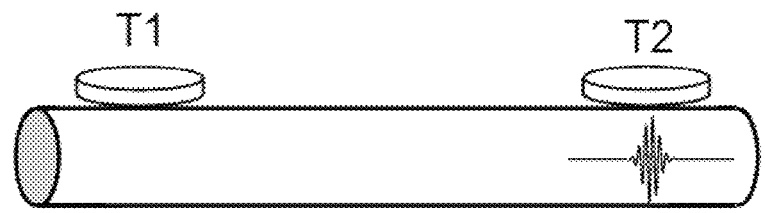
Figure 3C:
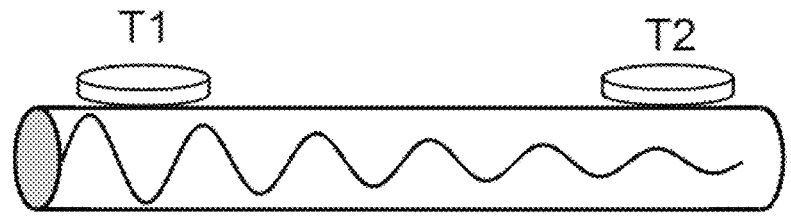

FIGS. 3*a*, 3*b* and 3*c* show different options for determining the traveling direction of a sound wave traveling along the pipe 15, 17 the ultrasonic flow meters 13 is installed at and/or along fluid within said pipe 15, 17. In the shown examples, the ultrasonic flow meter 13 comprises a measuring tube 25 which extends along the pipe the ultrasonic flow meter 13 is installed at. In FIGS. 3*a*, 3*b* and 3*c*, the nominal flow direction of fluid through the measuring tube 25 is from left to right, i.e. the measuring tube 25 has an inlet 27 shown on the left-hand side and an outlet 29 shown on the right-hand side. The ultrasonic flow meter 13 comprises two ultrasonic transducers T1, T2. A first ultrasonic transducer T1 is located closer to the inlet 27 than a second ultrasonic transducer T2 being located closer to the outlet 29. Thereby, the ultrasonic transducers T1, T2 have an axial distance D to each other (the ultrasonic transducers are spaced apart a distance D with respect to an axial pipe/flow direction). In a fluid-flow situation, the ultrasonic transducers T1, T2 are used to transmit and receive ultrasonic signals for determining a fluid flow through the measuring tube 25. In a no-fluid-flow situation, however, the ultrasonic transducers T1, T2 are used to listen to sound waves traveling along the pipe 15, 17 and thus the measuring tube 25 and/or the fluid within the measuring tube 25.

FIG. 3*a* shows an example of a continuous sinusoidal sound wave 31 traveling along the measuring tube 25. Due to the axial distance D between the two ultrasonic transducers T1, T2, there is a phase shift in the signals produced by the two transducers T1, T2. The sign of the phase shift is indicative of the traveling direction of the sound wave 31. Therefore, the traveling direction of the sound wave 31 can be determined based on the phase shift of the signals generated by the two ultrasonic transducers T1, T2.

FIG. 3*b* shows the same ultrasonic transducers in a situation when a sound wave in form of sound pulse 33 travels along the measuring tube 25 in the nominal flow direction, shown in FIG. 3*b* from left to right. The first ultrasonic transducer T1 located closer to the inlet 27 detects the sound pulse 33 earlier than the second transducer T2 located closer to the outlet 29. Therefore, a time shift Δt between the signals generated by the ultrasonic transducers T1, T2 is indicative of the traveling direction of the sound pulse 33.

In FIG. 3*c*, the same ultrasonic flow meter 13 is shown in a situation of a sound wave 35 decaying in amplitude along its travel from the first transducer T1 to the second transducer T2. Therefore, an amplitude difference between the signals generated by the two ultrasonic transducers T1, T2 is indicative of the traveling direction of the sound wave 35.

Where, in the foregoing description, integers or elements are mentioned which have known, obvious or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as optional, preferable, advantageous, convenient or the like are optional and do not limit the scope of the independent claims.

The above embodiments are to be understood as illustrative examples of the disclosure. It is to be understood that any feature described in relation to any one embodiment may be used alone, or in combination with other features described, and may also be used in combination with one or more features of any other of the embodiments, or any combination of any other of the embodiments. While at least one exemplary embodiment has been shown and described, it should be understood that other modifications, substitutions and alternatives are apparent to one of ordinary skill in the art and may be changed without departing from the scope of the subject matter described herein, and this application is intended to cover any adaptations or variations of the specific embodiments discussed herein.

In addition, "comprising" does not exclude other elements or steps, and "a" or "one" does not exclude a plural number. Furthermore, characteristics or steps which have been described with reference to one of the above exemplary embodiments may also be used in combination with other characteristics or steps of other exemplary embodiments described above. Method steps may be applied in any order or in parallel or may constitute a part or a more detailed version of another method step. It should be understood that there should be embodied within the scope of the patent warranted hereon all such modifications as reasonably and properly come within the scope of the contribution to the art. Such modifications, substitutions and alternatives can be made without departing from the spirit and scope of the disclosure, which should be determined from the appended claims and their legal equivalents.

While specific embodiments of the invention have been shown and described in detail to illustrate the application of the principles of the invention, it will be understood that the invention may be embodied otherwise without departing from such principles.

LIST OF REFERENCE NUMERALS 1 fluid pipe network
3 consumer site
5 district heating plant
7 heat exchanger
9 heating system
11 circulator pump
13 ultrasonic flow meter
15 pipe connecting to feed line
17 pipe connecting to return line
19 temperature sensors
21 head-end-system (HES)
23 leakage
25 measuring tube
27 inlet
29 outlet
31 sinusoidal sound wave
33 sound pulse
35 sound with decaying amplitude
T1 first transducer
T2 second transducer
101 start
103 stop flow rate measurement
105 detect sound wave
107 compensate for background noise baseline
109 determine traveling direction of sound wave
111 use traveling direction as filter criterium
113 isolate dominant frequency band in background noise
115 associate dominant frequency band with a typical background noise source
117 set background noise baseline
119 determine a leakage information data
121 reporting leakage information data
123 process leakage information data
125 end

What is claimed is:

1. An ultrasonic flow meter for measuring a fluid flow in a pipe connecting a consumer site to a fluid pipe network, the ultrasonic flow meter comprising:
a first ultrasonic transducer and a second ultrasonic transducer, which is spaced apart an axial distance to the first ultrasonic transducer and with the first and second ultrasonic transducers configured to measure ultrasound signals to detect at least one sound wave traveling along the pipe or along fluid within the pipe or along the pipe and along fluid within the pipe from one or more sound sources to the ultrasonic flow meter as a single ultrasonic flow meter, wherein the at least one sound wave comprises a sound wave from the one sound source or a superposition of sound waves from the one or more sound sources; and
a processing means in signal connection with the ultrasonic transducers, the processing means being configured to:
determine a traveling direction of the detected sound wave based on the processing means detecting a phase shift between a first signal generated by the first ultrasonic transducer and a second signal generated by the second ultrasonic transducer, based on the processing means detecting a time shift between the first signal generated by the first ultrasonic transducer and the second signal generated by the second ultrasonic transducer or based on the processing means detecting an amplitude difference between the first signal generated by the first ultrasonic transducer and the second signal generated by the second ultrasonic transducer or based on any combination of the processing means detecting a phase shift, a time shift and an amplitude difference between the first signal generated by the first ultrasonic transducer of the at least one ultrasonic flow meter and the second signal generated by the second ultrasonic transducer of the single ultrasonic flow meter; and
upon determining that the detected sound wave is traveling towards the consumer site or upon determining that the detected sound wave comprises one or more sound waves traveling towards the consumer site and one or more sound waves traveling away from the consumer site, increasing a signal to noise ratio by distinguishing the one or more sound waves traveling towards the consumer site from the one or more sound waves traveling away from the consumer site, wherein the signal is the one or more sound waves traveling towards the consumer site and are a leakage sound indicator; and wherein the noise is the one or more sound waves traveling away from consumer site and are a background noise indicator.

2. The ultrasonic flow meter according to claim 1, wherein the processing means is configured to determine, that at least one sound wave is a superposition of a first sound wave traveling towards the consumer site and a second sound wave traveling away from the consumer site, wherein the traveling direction is used as a filter criterium for the increasing of the signal-to-noise ratio for separating the one or more sound waves traveling towards the consumer site from the one or more sound waves traveling away from the consumer site and, the processing means is configured to determine that the first sound wave is a leakage sound indicator and that the second sound wave is background noise indicator and to increase a leakage sound indicator to background noise indicator ratio.

3. The ultrasonic flow meter according to claim 1, wherein for the increasing of the signal-to-noise ratio the processing means is configured to identify a dominant frequency band in said detected at least one sound wave if said detected at least one sound wave is determined to be background noise, and subtract the dominant frequency band from the detected at least one sound wave.

4. The ultrasonic flow meter according to claim 1, wherein the processing means is configured to set or update leakage information data, the leakage information data comprising information about an amplitude of said at least one of the at least one sound wave and the traveling direction of said at least one of the at least one sound wave as a leakage sound indicator or a background noise indicator.

5. The ultrasonic flow meter according to claim 4, wherein the first and second ultrasonic transducers are configured to measure ultrasound signals for determining a fluid flow data or consumption data or fluid flow and consumption data and further comprising measuring a fluid flow through the pipe, wherein setting or updating the leakage information data is regularly, continuously or sporadically performed based on a predetermined schedule or upon an external command, and only when a measured fluid flow is below a flow threshold or is zero.

6. The ultrasonic flow meter according to claim 4, the ultrasonic flow meter is configured to wirelessly transmit, regularly or sporadically based on a predetermined schedule, or upon an external command, the leakage information data from the at least one ultrasonic flow meter to an automatic meter reading system.

7. The ultrasonic flow meter according to claim 6, wherein the leakage information data is transmitted in a course of scheduled readings of fluid flow and/or consumption data.

8. The ultrasonic flow meter according to claim 6, the ultrasonic flow meter is configured to validate the leakage information data by comparison with leakage information data received within a predetermined time window by the automatic meter reading system from one or more other ultrasonic flow meters installed at other pipes connecting other consumer sites to the fluid pipe network, wherein the one or more other ultrasonic flow meters are each provided with an ultrasonic transducer or a plurality of ultrasonic transducers configured to detect at least one sound wave traveling along the other pipe or along fluid within the other pipe or along the other pipe and along fluid within the other pipe from a sound source to the other at least one ultrasonic flow meter and the other one or more other ultrasonic flow meters are each provided with another device processing means in signal connection with the other at least one ultrasonic transducer, the other device processing means being configured to determine a traveling direction of at least one of the at least one sound wave and based on the determination, to determine whether said sound wave is traveling towards the consumer site or said sound wave is traveling away from the consumer site.

9. The ultrasonic flow meter according to claim 4, wherein the ultrasonic flow meter is configured to receive a leakage detection command signal wirelessly transmitted from an automatic meter reading system to the single ultrasonic flow meter, wherein setting or updating the leakage information data is performed upon reception of the leakage detection command signal.

10. The ultrasonic flow meter according to claim 9, wherein the ultrasonic flow meter is configured to receive the automatic meter reading system leakage information data from one of the at least one ultrasonic flow meter, wherein the leakage detection command signal is transmitted to one or more ultrasonic flow meters in the vicinity of said ultrasonic flow meter for validating said information data.

11. The ultrasonic flow meter according to claim 1, in combination with at least one other ultrasonic flow meter as part of an automatic meter reading system configured for:
monitoring a plurality of ultrasonic flow meters installed at different pipes connecting different consumer sites to the fluid pipe network, wherein the plurality of ultrasonic flow meters are each provided with an ultrasonic transducer or a plurality of ultrasonic transducers configured to detect at least one sound wave traveling along the different pipe or along fluid within the different pipe or along the different pipe and along fluid within the different pipe from a sound source to the plurality of ultrasonic flow meters and the plurality of ultrasonic flow meters are each provided with a processing means in signal connection with the ultrasonic transducer or plurality of ultrasonic transducers, the processing means being configured to determine a traveling direction of at least one detected sound wave and based on the determination, to determine whether said detected sound wave is traveling towards the consumer site or said sound wave is traveling away from the consumer site; and
receiving leakage information data at the automatic meter reading system from one or more of said plurality of ultrasonic flow meters.

12. The ultrasonic flow meter according to claim 1, wherein the traveling direction towards the consumer site is a nominal direction of fluid flow through the ultrasonic flow meter.

13. A system for acoustic leakage detection in a fluid pipe network, the system comprising:
an ultrasonic flow meter for measuring a fluid flow in a pipe connecting a consumer site to a fluid pipe network, the ultrasonic flow meter comprising:
a first ultrasonic transducer and a second ultrasonic transducer, which is spaced apart an axial distance to the first ultrasonic transducer and with the first and second ultrasonic transducers configured to measure ultrasound signals for determining fluid flow data or consumption data or fluid flow and consumption data and further configured to detect at least one sound wave traveling along the pipe or along fluid within the pipe or along the pipe an along fluid within the pipe from one or more sound sources to the ultrasonic flow meter as a single ultrasonic flow meter;
a processing means in signal connection with the ultrasonic transducers, the processing means being configured to:
determine a traveling direction of the detected sound wave based on a phase shift, on a time shift and/or on an amplitude difference between a first signal generated by the first ultrasonic transducer and a second signal generated by the second ultrasonic transducer;
upon determining that the detected sound wave is traveling towards the consumer site or upon determining that the detected sound wave comprises one or more sound waves traveling towards the consumer site and one or more sound waves traveling away from the consumer site, increasing a signal to noise ratio by distinguishing the one or more sound waves traveling towards the consumer site from the one or more sound waves traveling away from the consumer site, wherein the signal is the one or more sound waves traveling towards the consumer site and provides an indication of a leakage sound; and wherein the noise is the one or more sound waves traveling away from consumer site and provides an indication of background noise; and a wireless signal transmitter configured to wirelessly transmit, regularly or sporadically based on a predetermined schedule, or upon an external command, leakage information data comprising information about an amplitude of said detected sound wave and the traveling direction of said detected sound wave; and an automatic meter reading system for wirelessly receiving the fluid flow data or consumption data or fluid flow and consumption data from the wireless signal transmitter of the ultrasonic flow meter.

14. The system according to claim 13, wherein the ultrasonic flow meter is configured to transmit the leakage information data in a course of scheduled readings of the fluid flow data or consumption data or fluid flow and consumption data.

15. The system according to claim 13, wherein the automatic meter reading system is configured to validate the leakage information data received from the ultrasonic flow meter by comparison with leakage information data received within a predetermined time window from one or more other ultrasonic flow meters installed at other pipes connecting other consumer sites to the fluid pipe network.

16. The system according to claim 13, wherein the automatic meter reading system is configured to wirelessly transmit a leakage detection command signal to the ultrasonic flow meter, wherein the ultrasonic flow meter is configured to set or update the leakage information data upon reception of the leakage detection command signal.

17. The system according to claim 13, further comprising at least another ultrasonic flow meter, to provide a plurality of ultrasonic flow meters installed at different pipes connecting different consumer sites to the fluid pipe network, wherein the automatic meter reading system is configured to receive leakage information data from one or more of said plurality of ultrasonic flow meters.

18. The system according to claim 16, wherein the automatic meter reading system is configured to transmit the leakage detection command signal to another one or more of said plurality of ultrasonic flow meters in the vicinity of said ultrasonic flow meter for validating said leakage information data.

* * * * *